(12) United States Patent
Liu

(10) Patent No.: US 7,753,559 B2
(45) Date of Patent: Jul. 13, 2010

(54) LIGHTING DEVICE PRODUCING LIGHT WITH ADJUSTABLE COLOR AND COLOR TEMPERATURE

(75) Inventor: Chia-Yu Liu, Taipei (TW)

(73) Assignee: Lite-On It Corporation, Taipei (TW)

( * ) Notice: Subject to any disclaimer, the term of this patent is extended or adjusted under 35 U.S.C. 154(b) by 273 days.

(21) Appl. No.: 12/145,101

(22) Filed: Jun. 24, 2008

(65) Prior Publication Data

US 2009/0116218 A1 May 7, 2009

(51) Int. Cl.
*F21V 9/16* (2006.01)
*F21V 9/00* (2006.01)

(52) U.S. Cl. .......................... 362/293; 362/34; 362/84; 362/260; 313/502

(58) Field of Classification Search ................... 362/34, 362/84, 260, 293; 313/502
See application file for complete search history.

(56) References Cited

U.S. PATENT DOCUMENTS 7,265,488 B2 * 9/2007 Ng et al. ..................... 313/501

* cited by examiner

*Primary Examiner*—Stephen F Husar
*Assistant Examiner*—James W Cranson
(74) *Attorney, Agent, or Firm*—Thomas, Kayden, Horstemeyer & Risley

(57) ABSTRACT

A lighting device includes a light source, at least one seal block, at least one wavelength conversion material and a concentration adjusting unit. The light source emits light of a first wavelength. The wavelength conversion material is filled in the seal block. The concentration adjusting unit is disposed on the seal block for controlling concentration distribution of the wavelength conversion material in the seal block. The light emitted by the light source is absorbed by the wavelength conversion material and converted into light of second wavelength different from the first wavelength.

17 Claims, 4 Drawing Sheets

LIGHTING DEVICE PRODUCING LIGHT WITH ADJUSTABLE COLOR AND COLOR TEMPERATURE

FIELD OF THE INVENTION

The present invention relates to a lighting device for producing light with adjustable color and color temperature, and more particularly to a lighting device for producing light with adjustable color and color temperature by using a single light source and adjusting the concentration distribution of the wavelength conversion materials.

BACKGROUND OF THE INVENTION

Nowadays, with increasing awareness of environmental protection, more and more products are designed in views of low power consumption. Since most power consumed by an incandescent bulb is radiated as heat, rather than as visible light, the incandescent bulb has very low luminous efficiency. Mercury vapor lamps are relatively efficient but they must be carefully handled and properly disposed because the released mercury vapor often contaminates the air we breathe. For environmental friendliness, the incandescent bulbs and the mercury vapor lamps are gradually replaced by light emitting diodes (LEDs) in many applications.

A light emitting diode is a semiconductor diode capable of emitting light with high luminous efficiency. Different from a common incandescent bulb, the light emitting diode has the advantages of small size, no heat radiation, low power consumption, long service life, and quick response speed. For fabricating a light emitting diode, a semiconductor substrate is doped with a variety of dopants to improve optical properties. By changing the concentration of the dopants or the packaging structure, an intended single color of the light emitted by the light emitting diode is achieved.

Typically, LED is used as a light source. In some cases, for expanding the applications of the LED, it is desirable to change the color of light to meet the practical requirement.

U.S. Pat. No. 6,357,889 disclosed a color tunable light source that contains multiple light emitting diodes (LEDs) with different emission wavelengths and multiple phosphors with different excitation and emission wavelengths. The phosphors can absorb the light emitted by the light emitting diodes and release light of different wavelengths from those of the absorbed light. By variably controlling power supplied to these light emitting diodes, light of different wavelengths are emitted. Through color mixing, the color of the light emitted by the light source is varied.

U.S. Pat. No. 6,636,003 disclosed a color temperature adjustable lighting device that contains multiple colored LEDs and multiple white LEDs with different arrangement. By variably controlling drive currents supplied to these LEDs, light of different intensities are emitted. The colored light emitted from the colored LEDs are combined with the white light emitted from the white LEDs to produce resultant light having a desired color temperature adjustable white light.

As previously described, since multiple LEDs are necessary to adjust the color or the color temperature of the lighting device, the control circuitry becomes very complicated. In addition, the tunable color or the color temperature is usually restricted to a narrow extent.

Therefore, there is a need of providing a lighting device for producing light with adjustable color and color temperature by using a single light source.

SUMMARY OF THE INVENTION

The present invention provides a lighting device for producing light with adjustable color and color temperature by using a single light source and adjusting the concentration distribution of the wavelength conversion materials.

In accordance with a first aspect of the present invention, there is provided a lighting device. The lighting device includes a light source, at least one seal block, at least one wavelength conversion material and a concentration adjusting unit. The light source emits light of a first wavelength. The wavelength conversion material is filled in the seal block. The concentration adjusting unit is disposed on the seal block for controlling concentration distribution of the wavelength conversion material in the seal block. The light emitted by the light source is absorbed by the wavelength conversion material and converted into light of second wavelength different from the first wavelength.

In accordance with a second aspect of the present invention, there is provided a lighting device. The lighting device includes a light source, at least one seal block, at least one wavelength conversion material and a plurality of electrodes. The light source emits light of a first wavelength. The wavelength conversion material, which includes charged particle swarms and is filled in the seal block. The plurality of electrodes are arranged on bilateral sides of the seal block for applying a voltage on the seal block, wherein concentration distribution of the wavelength conversion material in the seal block is determined according to the voltage, and the light emitted by the light source is absorbed by the wavelength conversion material and converted into light of second wavelength different from the first wavelength.

In accordance with a third aspect of the present invention, there is provided a lighting device. The lighting device includes a light source, at least one seal block, at least one wavelength conversion material and at least a motor-driven element. The light source emits light of a first wavelength. The wavelength conversion material is filled in the seal block. The motor-driven element is coupled with the seal block for adjusting capacity of the seal block. The concentration distribution of the wavelength conversion material in the seal block is determined according to the capacity of the seal block. The light emitted by the light source is absorbed by the wavelength conversion material and converted into light of second wavelength different from the first wavelength.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed. The schematic drawings, not to scale, are employed to illustrate the specific features of the present invention.

The present invention relates to a lighting device. The lighting device includes a light source, at least one seal block and a concentration adjusting unit. The at least one seal block is filled with at least one wavelength conversion material. The concentration adjusting unit is disposed on the seal block for controlling concentration distribution of the wavelength conversion material contained in the seal block.

Figure 1:
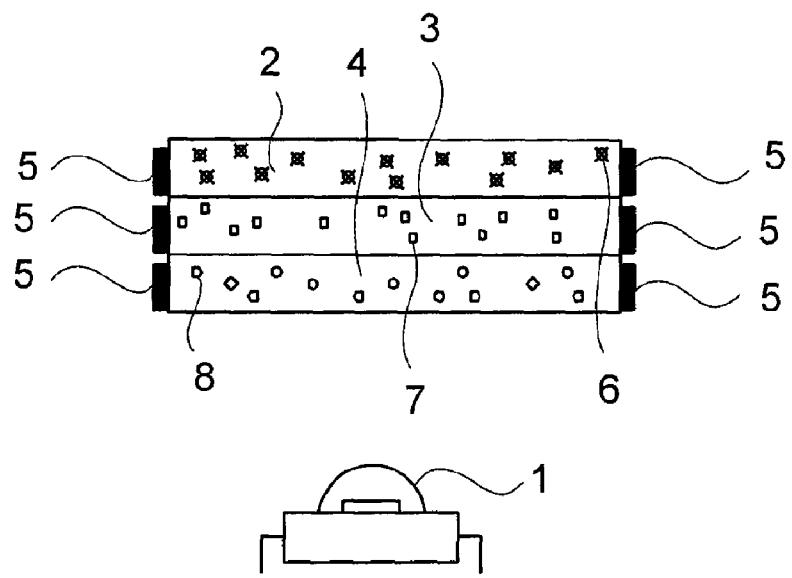
FIG. 1 is a schematic cross-sectional view of a lighting device according to a first preferred embodiment of the present invention.

Referring to FIG. 1, a schematic cross-sectional view of a lighting device according to a first preferred embodiment of the present invention is illustrated. In this embodiment, the lighting device includes a light source 1, a first seal block 2, a second seal block 3, a third seal block 4 and a concentration adjusting unit. The first seal block 2, the second seal block 3 and the third seal block 4 are filled with a first wavelength conversion material 6, a second wavelength conversion material 7 and a third wavelength conversion material 8, respectively. These wavelength conversion materials 6, 7 and 8 are charged particle swarms. The concentration adjusting unit comprises a plurality of electrodes 5, which are arranged on bilateral sides of the first seal block 2, the second seal block 3 and the third seal block 4.

In this embodiment, the light source 1 is a light emitting diode (LED) or a fluorescent lamp. These wavelength conversion materials 6, 7 and 8 are phosphors covering charged ions or charged phosphors. These wavelength conversion materials 6, 7 and 8 can absorb the light emitted by the light source 1 and release light of different wavelengths. When a voltage is applied to the bilateral electrodes 5 of the seal blocks 2, 3 and 4, the wavelength conversion materials 6, 7 and 8 contained in the seal blocks 2, 3 and 4 will move toward one of the bilateral electrodes 5 according to the electrical properties of the wavelength conversion materials 6, 7 and 8. As a consequence, the concentration distributions of the wavelength conversion materials 6, 7 and 8 contained in the seal blocks 2, 3 and 4 are changed. The concentrations of the wavelength conversion materials 6, 7 and 8 contained in the middle portions of the seal blocks 2, 3 and 4 are relatively small.

When the light emitted by the light source 1 penetrates through the seal blocks 2, 3 and 4, portions of the light are absorbed by the wavelength conversion materials 6, 7 and 8 and then converted into the released light of different wavelengths. By mixing the released light in proper proportions, resultant light having a desired color and a desired color temperature is produced.

If the magnitude of voltage is increased, more wavelength conversion materials are attracted by one of the bilateral electrodes and less wavelength conversion materials are contained in the middle portions. By changing the magnitude of voltage applied to the bilateral electrodes 5 of the seal blocks 2, 3 and 4, the profiles of the concentration distributions of the wavelength conversion materials 6, 7 and 8 contained in the seal blocks 2, 3 and 4 are changed. In other words, the concentrations of the wavelength conversion materials contained in the middle portions are adjustable by changing the voltages applied to each of the seal blocks.

Hereinafter, an embodiment of producing resultant light having a desired color and a desired color temperature by adjusting the voltages applied to each of the seal blocks and the concentration distributions of the wavelength conversion materials will be illustrated with reference to FIG. 2 and FIG. 3.

Figure 2:
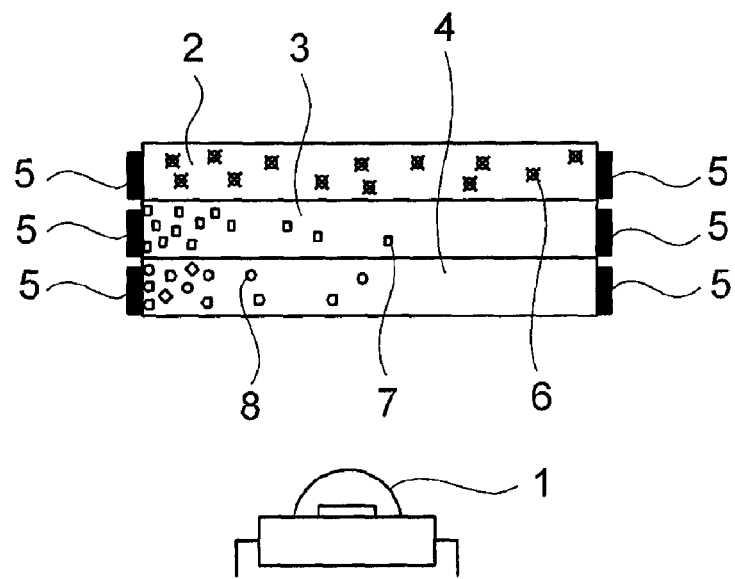
FIG. 2 schematically illustrates a lighting device of FIG. 1 by applying a relatively higher voltage to the electrodes thereof.

Referring to FIG. 2, a lighting device of the present invention by applying a relatively higher voltage to the electrodes thereof is schematically illustrated. In this embodiment, the light source 1 is a UV light emitting diode. The first wavelength conversion material 6 is a negative charged red phosphor filled in the first seal block 2. The second wavelength conversion material 7 is a negative charged blue phosphor filled in the second seal block 3. The third wavelength conversion material 8 is a negative charged green phosphor filled in the third seal block 4.

When a first voltage is applied to bilateral electrodes 5 of the second seal block 3 and the third seal block 4, the negative charged blue phosphor 7 filled in the second seal block 3 and the negative charged green phosphor filled 8 in the third seal block 4 are attracted by and moved toward the high-potential electrodes 5. As a consequence, the concentrations of the negative charged blue phosphor 7 and the negative charged green phosphor 8 contained in the middle portions of the seal blocks 3 and 4 are reduced. When the light emitted by the UV light emitting diode 1 penetrates through the seal blocks 2, 3 and 4, the proportion of the light to be converted by the negative charged blue phosphor 7 into blue light and the proportion of the light to be converted by the negative charged green phosphor 8 into green light are both reduced. Since no voltage is applied to bilateral electrodes 5 of the first seal block 2, the negative charged red phosphor 6 is uniformly distributed throughout the first seal block 2 and the proportion of the light to be converted by the negative charged red phosphor 6 into red light is kept unchanged. Under this circumstance, the resultant light of the lighting device appears to be red light because most of the light emitted by the UV light emitting diode 1 is converted by the negative charged red phosphor 6 into red light.

Figure 3:
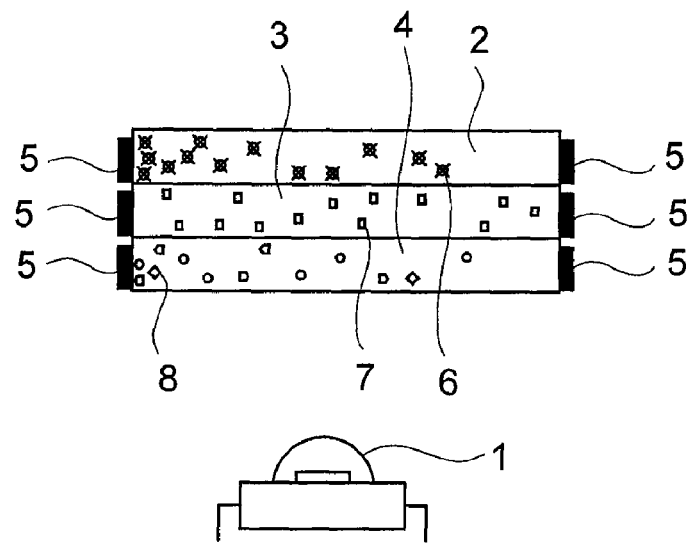
FIG. 3 schematically illustrates a lighting device of FIG. 1 by applying a relatively lower voltage to the electrodes thereof.

Referring to FIG. 3, a lighting device of the present invention by applying a relatively lower voltage to the electrodes thereof is schematically illustrated. In this embodiment, the light source 1 is a UV light emitting diode. The first wavelength conversion material 6 is a negative charged red phosphor filled in the first seal block 2. The second wavelength conversion material 7 is a negative charged blue phosphor filled in the second seal block 3. The third wavelength conversion material 8 is a negative charged green phosphor filled in the third seal block 4. If no voltage is applied to bilateral electrodes 5 of the seal blocks 2, 3 and 4, the red phosphor 6, the blue phosphor 7 and the green phosphor 8 are uniformly distributed throughout the seal blocks 2, 3 and 4, respectively. In addition, the concentrations of the red phosphor 6, the blue phosphor 7 and the green phosphor 8 are identical.

When a second voltage smaller than the first voltage is applied to bilateral electrodes 5 of the first seal block 2 and the third seal block 4, the negative charged red phosphor 6 filled in the first seal block 2 and the negative charged green phosphor filled 8 in the third seal block 4 are attracted by and moved toward the high-potential electrodes 5. Since the second voltage is small, the concentrations of the negative charged red phosphor 6 and the negative charged green phosphor 8 contained in the middle portions of the seal blocks 2 and 4 are slightly reduced. In other words, the proportion of the light to be converted by the negative charged red phosphor 6 into red light and the proportion of the light to be converted by the negative charged green phosphor 8 into green light are both slightly reduced. Since no voltage is applied to bilateral electrodes 5 of the second seal block 3, the negative charged blue phosphor 5 is uniformly distributed throughout the second seal block 3 and the proportion of the light to be converted by the negative charged blue phosphor 5 into blue light is kept unchanged. Under this circumstance, a greater proportion of the light to be converted by the negative charged blue phosphor 5 are mixed with less proportions of the emitted light to be converted by the phosphors 6 and 8, so that the resultant light of the lighting device appears to be white light with cold color temperature.

From the above description, by controlling the voltage applied to either of the seal blocks 2, 3 and 4 and thus adjusting the concentration distributions of the wavelength conversion materials 6, 7 and 8, the resultant light of the lighting device can have a desired color and a desired color temperature. Moreover, as the contents of the wavelength conversion materials are increased, the lighting device can produce light in more diverse colors.

Figure 4:
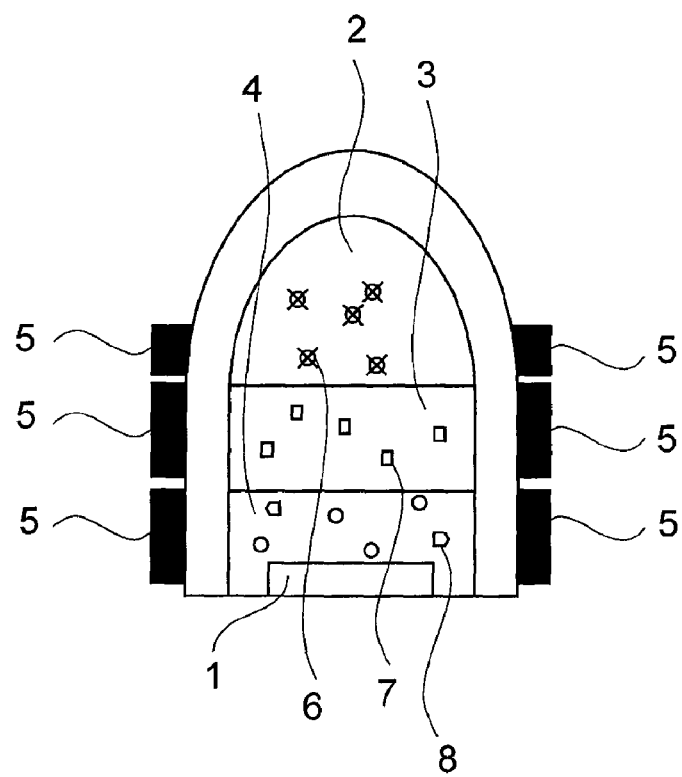
FIG. 4 is a schematic cross-sectional view of a lighting device according to a second preferred embodiment of the present invention.

Referring to FIG. 4, a schematic cross-sectional view of a lighting device according to a second preferred embodiment of the present invention is illustrated. In this embodiment, the lighting device includes a light source 1, a first seal block 2, a second seal block 3, a third seal block 4 and a concentration adjusting unit. The first seal block 2, the second seal block 3 and the third seal block 4 are filled with a first wavelength conversion material 6, a second wavelength conversion material 7 and a third wavelength conversion material 8, respectively. These wavelength conversion materials 6, 7 and 8 are charged particle swarms. The concentration adjusting unit comprises a plurality of electrodes 5, which are arranged on bilateral sides of the first seal block 2, the second seal block 3 and the third seal block 4.

The operation principles of the lighting device according the second preferred embodiment are identical to those described in the first embodiment, and are not redundantly illustrated herein. The light source 1 of the lighting device of the first embodiment is separated from the seal blocks 2, 3 and 4. Whereas, the light source 1 of the lighting device of the second embodiment and the seal blocks 2, 3 and 4 are encapsulated together.

Figure 5:
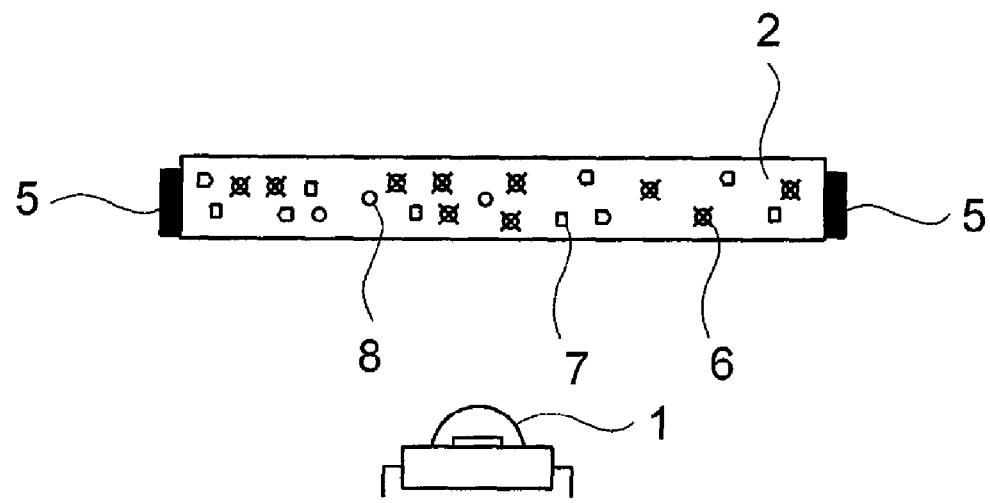
FIG. 5 is a schematic cross-sectional view of a lighting device according to a third preferred embodiment of the present invention.

Referring to FIG. 5, a schematic cross-sectional view of a lighting device according to a third preferred embodiment of the present invention is illustrated. In this embodiment, the lighting device includes a light source 1, a block 2 and a concentration adjusting unit. The seal block 2 is filled with a first wavelength conversion material 6, a second wavelength conversion material 7 and a third wavelength conversion material 8. These wavelength conversion materials 6, 7 and 8 are charged particle swarms. The concentration adjusting unit comprises a plurality of electrodes 5, which are arranged on bilateral sides of the seal block 2.

In this embodiment, the light source 1 is a light emitting diode (LED) or a fluorescent lamp. These wavelength conversion materials 6, 7 and 8 are phosphors covering charged ions or charged phosphors. The contents and the charge densities of these wavelength conversion materials 6, 7 and 8 are different. These wavelength conversion materials 6, 7 and 8 can absorb the light emitted by the light source 1 and release light of different wavelengths. When a voltage is applied to the bilateral electrodes 5 of the seal block 2, the wavelength conversion materials 6, 7 and 8 contained in the seal block 2 will move toward one of the bilateral electrodes 5 according to the electrical properties of the wavelength conversion materials 6, 7 and 8. As a consequence, the concentration distributions of the wavelength conversion materials 6, 7 and 8 contained in the seal block 2 are changed. The concentrations of the wavelength conversion materials 6, 7 and 8 contained in the middle portion of the seal block 2 are relatively small. When the light emitted by the light source 1 penetrates through the seal block 2, portions of the light are absorbed by the wavelength conversion materials 6, 7 and 8 and then converted into the released light of different wavelengths. By mixing the released light in proper proportions, resultant light having a desired color and a desired color temperature is produced.

Figure 6:
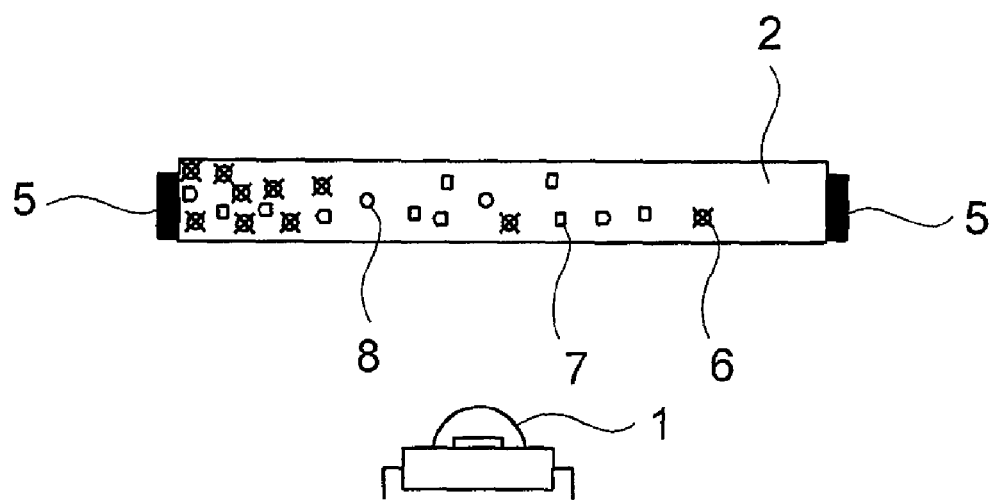
FIG. 6 schematically illustrates the lighting device of FIG. 5 by applying a voltage to the electrodes thereof.

FIG. 6 schematically illustrates the lighting device of FIG. 5 by applying a voltage to the electrodes thereof. In this embodiment, the light source 1 is a light emitting diode (LED) or a fluorescent lamp. The first wavelength conversion material 6, the second wavelength conversion material 7 and the third wavelength conversion material 8 are respectively negative charged red, blue and green phosphors filled in the seal block 2. As for the contents and the charge densities, the negative charged red phosphor 6 is greater than the negative charged green phosphor 8 and the negative charged green phosphor 8 is greater than the negative charged blue phosphor 7.

When a voltage is applied to bilateral electrodes 5 of the seal block 2, the negative charged red phosphor 6, the negative charged blue phosphor 7 and the negative charged green phosphor filled 8 in the seal block 2 are attracted by and moved toward the high-potential electrodes 5. As a consequence, the concentrations of the negative charged red phosphor 6 and the negative charged green phosphor 8 contained in the middle portions of the seal block 2 are largely reduced to be lower than the concentration of the negative charged blue phosphor 7. When the light emitted by the UV light emitting diode 1 penetrates through the seal block 2, the proportion of the light to be converted by the negative charged red phosphor 6 into red light and the proportion of the light to be converted by the negative charged green phosphor 8 into green light are both reduced to be lower than the proportion of the light to be converted by the negative charged blue phosphor 7 into blue light. Under this circumstance, the resultant light of the lighting device appears to be blue light because most of the light emitted by the UV light emitting diode 1 is converted by the negative charged blue phosphor 7 into blue light. Whereas, if no voltage is applied to bilateral electrodes 5 of the seal block 2, the proportion of the light to be converted by the negative charged red phosphor 6 into red light is kept and is relatively higher and the resultant light of the lighting device appears to be red light.

Figure 7:
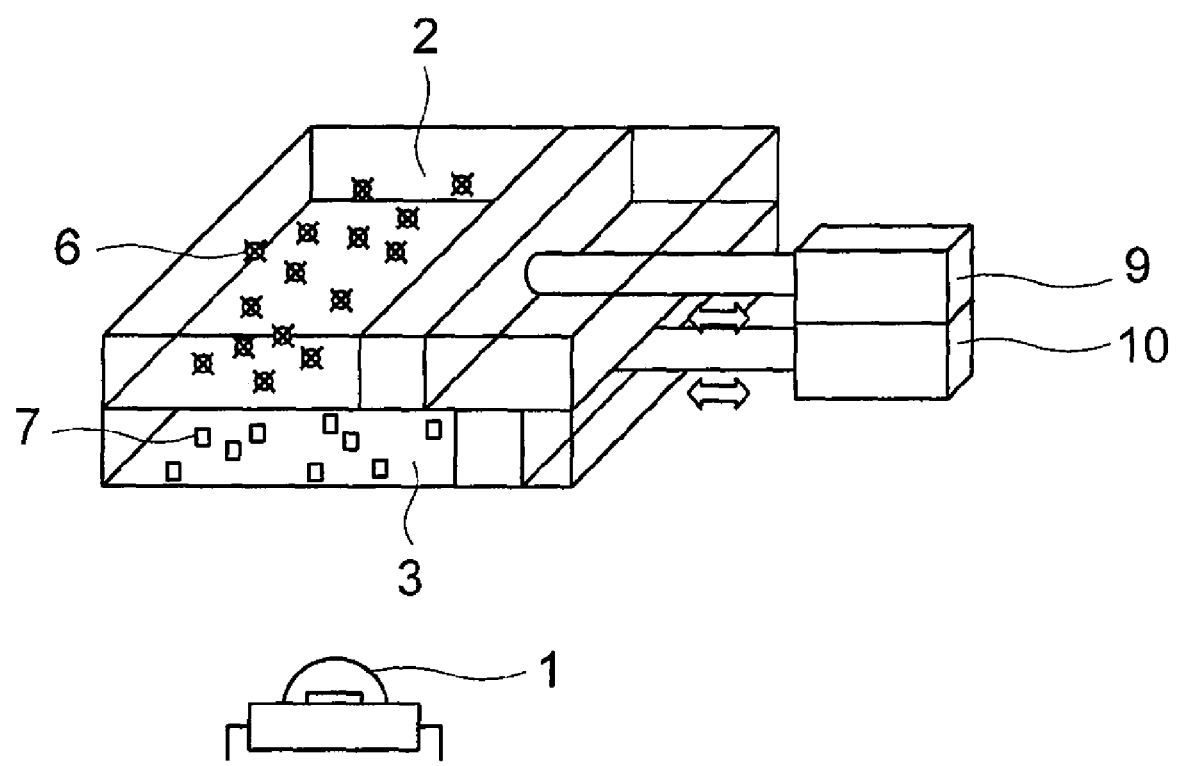
FIG. 7 is a schematic perspective view of a lighting device according to a fourth preferred embodiment of the present invention.

Referring to FIG. 7, a schematic perspective view of a lighting device according to a fourth preferred embodiment of the present invention is illustrated. In this embodiment, the lighting device includes a light source 1, a first seal block 2, a second seal block 3 and a concentration adjusting unit. The first seal block 2 and the second seal block 3 are filled with a first wavelength conversion material 6 and a second wavelength conversion material 7, respectively. The concentration adjusting unit includes a first motor-driven element 9 and a second motor-driven element 10, which are respectively coupled to the first seal block 2 and the second seal block 3.

In this embodiment, the light source 1 is a light emitting diode (LED) or a fluorescent lamp. These wavelength conversion materials 6 and 7 are phosphors for absorbing the light emitted by the light source 1 and releasing light of different wavelengths. Moreover, the first motor-driven element 9 and the second motor-driven element 10 can be electrically or manually controlled to adjust the capacity of the first seal block 2 and the second seal block 3. In a case that the first seal block 2 or the second seal block 3 is compressed by the first motor-driven element 9 or the second motor-driven element 10, the concentration of the first wavelength conversion material 6 or the second wavelength conversion material 7 is increased because the capacity of the first seal block 2 or the second seal block 3 is reduced. Whereas, if the first seal block 2 or the second seal block 3 is expanded, the concentration of the first wavelength conversion material 6 or the second wavelength conversion material 7 is decreased. In other words, by controlling the capacity of the first seal block 2 and the second seal block 3, the proportion of the light to be converted by the first wavelength conversion material 6 and the proportion of the light to be converted by the second wavelength conversion material 7 are adjustable, so that the lighting device can produce light in more diverse colors. In other words, by either compressing or expanding the seal blocks, the concentrations of the wavelength conversion materials are changed. By mixing the released light in proper proportions, resultant light having a desired color or white light with desired color temperature is produced.

From the above description, the lighting device of the present invention can produce light with desired color and desired color temperature by using a single light source and adjusting the concentration distribution of the wavelength conversion materials.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A lighting device comprising:
   a light source for emitting light of a first wavelength;
   at least one seal block;
   at least one wavelength conversion material filled in the seal block; and
   a concentration adjusting unit disposed on the seal block for controlling concentration distribution of the wavelength conversion material in the seal block, wherein the light emitted by the light source is absorbed by the wavelength conversion material and converted into light of second wavelength different from the first wavelength.

2. The lighting device according to claim 1 wherein the light source is a light emitting diode or a fluorescent lamp.

3. The lighting device according to claim 1 wherein the light source and the seal block are encapsulated together.

4. The lighting device according to claim 1 wherein the concentration adjusting unit includes a plurality of electrodes arranged on bilateral sides of the seal block for applying a voltage thereon.

5. The lighting device according to claim 4 wherein the wavelength conversion material is a phosphor covering charged ions or a charged phosphor.

6. The lighting device according to claim 1 wherein the concentration adjusting unit includes at least a motor-driven element, which is coupled with the seal block, for adjusting capacity of the seal block.

7. The lighting device according to claim 6 wherein the motor-driven element is electrically or manually controlled.

8. The lighting device according to claim 6 wherein the wavelength conversion material is a phosphor.

9. A lighting device comprising:
   a light source for emitting light of a first wavelength;
   at least one seal block;
   at least one wavelength conversion material, which includes charged particle swarms and is filled in the seal block; and
   a plurality of electrodes arranged on bilateral sides of the seal block for applying a voltage on the seal block, wherein concentration distribution of the wavelength conversion material in the seal block is determined according to the voltage, and the light emitted by the light source is absorbed by the wavelength conversion material and converted into light of second wavelength different from the first wavelength.

10. The lighting device according to claim 9 wherein the light source is a light emitting diode or a fluorescent lamp.

11. The lighting device according to claim 9 wherein the light source and the seal block are encapsulated together.

12. The lighting device according to claim 9 wherein the wavelength conversion material is a phosphor covering charged ions or a charged phosphor.

13. A lighting device comprising:
    a light source for emitting light of a first wavelength;
    at least one seal block;
    at least one wavelength conversion material, which is filled in the seal block; and
    at least a motor-driven element coupled with the seal block for adjusting capacity of the seal block, wherein concentration distribution of the wavelength conversion material in the seal block is determined according to the capacity of the seal block, and the light emitted by the light source is absorbed by the wavelength conversion material and converted into light of second wavelength different from the first wavelength.

14. The lighting device according to claim 13 wherein the light source is a light emitting diode or a fluorescent lamp.

15. The lighting device according to claim 13 wherein the light source and the seal block are encapsulated together.

16. The lighting device according to claim 13 wherein the motor-driven element is electrically or manually controlled.

17. The lighting device according to claim 13 wherein the wavelength conversion material is a phosphor.

* * * * *